United States Patent [19]

Bergeron et al.

[11] Patent Number: 4,596,980

[45] Date of Patent: Jun. 24, 1986

[54] LIGHT-EMITTING INDICATOR

[75] Inventors: Ned Bergeron; Theodore A. Stollberg, both of Houma, La.

[73] Assignee: B.W.B. Controls, Inc., Houma, La.

[21] Appl. No.: 524,983

[22] Filed: Aug. 22, 1983

[51] Int. Cl.4 .............................................. G08B 21/00
[52] U.S. Cl. ...................................... 340/626; 340/60; 340/691; 116/277; 137/557
[58] Field of Search .................... 340/691, 626, 58, 60; 137/557, 556; 116/266, 277, 268

[56] References Cited

U.S. PATENT DOCUMENTS

| | | | |
|---|---|---|---|
| 3,683,350 | 8/1972 | Shedenheim | 340/691 X |
| 3,934,238 | 1/1976 | Pavlou | 340/60 X |
| 3,938,078 | 2/1976 | Davis et al. | 340/58 |

Primary Examiner—James L. Rowland
Assistant Examiner—Chi K. Lau
Attorney, Agent, or Firm—George A. Bode

[57] ABSTRACT

A light-emitting indicator comprising: a housing having a longitudinal bore therethrough, a moveable member at least partially positioned within said bore, a light-emitting diode operable as a function of the position of the moveable member within the bore, a lens for displaying the light emitted from said light-emitting diode, and a bore provided in the upper portion of the moveable member for containing the light-emitting diode within the moveable member when the indicator is in its first operative position.

5 Claims, 4 Drawing Figures

IN SERVICE

OUT OF SERVICE

LIGHT-EMITTING INDICATOR

BACKGROUND OF THE INVENTION

1. Field of the Invention

The apparatus of the present invention relates to indicators with lenses. More particularly, the apparatus of the present invention relates to an indicator having a light emitting diode or bulb for indicating the operative state of the indicator valve through the lens body.

2. General Background

In various aspects of industrial and commercial uses, very often there is utilized a viewing lens to indicate to a viewer, or a person whose duty it is to monitor an indicator valve, the status of a particular system by color changes viewed in the lens. In a common industrial use, indicators have been used in certain types of valves, for example relay valves, wherein the valve is variable between an open and shut position, the open position allowing flow of fluids through the valve to an actuator in order to allow an oil well or the like to continue in production. Should there be a failure in the system, the relay would "shut-in" due to a change in a measured quantity, and the valve would shift from an opened to a closed position. Of course, in order to facilitate an operator knowing when the valve is in the opened or closed position, a type of indicator has been used throughout the years, in order to assist in that determination. What has become standard in the industry, is the use of a color coded indicator, wherein green would signify the valve is in the open position, and red would signify the valve in the closed position, thus indicating a problem in the system.

There is one type of indicator which has been utilized wherein the valve provides an internal stem which moves longitudinally within a bore in the valve so that internal pressure on the end of the stem provided with a piston would move the stem to an "up" position, the loss of pressure on the same end of the stem would move the stem back to the "down" position. In this particular indicator, the head of the stem is provided with green and red bands of color which when shifted from the down to the up position, the red or green band of color respectively will appear through a lens provided at the top of the valve for indicating the position of the valve. In order to give the operator a better view of the red or green color indication, a type of lucite (or plastic) lens has been used which would help to properly reflect the particular color as indicated.

In fact, B.W.B. Controls, Inc, is presently assigned an application for such an improved indicator lens, wherein an angulated indicator lens secured to the top portion of a relay valve would provide maximum refraction and disbursement of the several indicating colors on the valve stem. The lens body would have an interior angulated truncated surface of approximately 45° to the horizontal, with an exterior angulated, truncated upper surface of approximately 54° to the vertical. In the preferred embodiment, the transparent lens body would receive ambient red light from the stem providing the maximum refraction of light onto the first interior angulated surface and directing the color to be indicated through the lens medium and onto the second exterior angulated, truncated surface for maximum indicating area.

In describing the apparatus of the present invention, applicant shall make reference to this particular type of new lens, in order to more properly describe the optimum operation of the apparatus. However, it should be kept in mind that this particular apparatus, i.e., the light-emitting indicator, can be used with several of the type of lens presently on the market, and is not restricted to this particular type of indicator lens as will be described more fully in the specification and used in conjunction with the apparatus.

GENERAL DISCUSSION OF THE PRESENT INVENTION

The apparatus of the present invention is a vast improvement over the present state of the art in indicator lenses when used in conjunction with a relay valve having a valve stem moveable upwardly and downwardly within the valve body depending on the presence or absence of fluid under pressure within the valve, and with a type of indicator lens mounted on the upper portion of the valve body for indicating color through the lens as a function of the operative state of the valve. The apparatus of the present invention comprises a generally transparent lens body having an elongated central bore substantially therethrough. There is further provided a metal housing mounted stationarily in the bore, the housing providing an annular space wherein a battery is mounted. There is further provided a moveable mounting sleeve within the metal housing such that the upward and downward movement of the sleeve imparts upward and downward movement to the battery. Further, there is provided a stationary light-emitting diode (LED), wherein the battery, when it is in the down position, makes electrical contact with the LED for electrically energizing the same; and wherein when the battery is in the up position, the electrical connection is broken between the LED and the battery and the LED is deenergized. The battery is maintained in the down position against the bias of a spring mounted between the battery's upper end and a cap provided on the metal housing, and is moved to the up position against the bias of the spring with the upward movement of the valve stem thereby imparting upward movement to the moveable sleeve and thus the battery. In the preferred embodiment, the valve stem, which will move upwardly and downwardly in response to fluid under pressure being present or absent within the valve body, provides an enlarged bore within its top portion for accommodating the LED. In operation, as fluid under pressure is placed on a piston provided at the lower end of the stem, the force will move the stem upwardly and the LED, which is positioned downwardly in the lens body, will be accommodated in the enlarged bore of the stem, and thus be hidden from external view. With the stem moving upwardly, the stem's upper most portion exerts an upward force on the moveable sleeve containing the battery, thus moving the battery upwardly and breaking the electrical contact between the battery and the LED. A green colored area provided on the upper portion of the stem is now viewable in the lens indicating the operative status of the valve. Upon loss of fluid under pressure on the piston, the valve stem shifts downwardly, thus allowing the battery to shift to its down position to reestablish the circuit between the battery and the LED. Then, the LED will flash red and be viewable through the lens viewing surface indicating the non-operative position of the valve. The green area of the stem will now have shifted downwardly into accommodating bore of the stem of the valve body and be blocked from view by the stem.

Therefore, it is an object of the present invention to provide a valve with an indicator wherein the status of the operativeness of the valve is indicated through a light-emitting medium.

It is a further object of the present invention to provide an indicator valve in combination with a lens, for viewing a flashing light in the lens for indicating the operative state of the valve.

It is still a further object of the present invention to provide an apparatus having a self-contained selectively energized and deenergized light-emitting diode for indicating, through the indictor lens, a failure in the system through the use of a flashing red indicator.

In order to accomplish the above objects of the present invention, it is a feature of the present invention to provide an indicator valve containing a vertically disposed stem member, having an LED which is activated when the stem member is in a down position and is deactivated when the stem member is in an up position.

It is a further feature of the present invention to provide an indicator valve having a lens which contains an LED selectively energized and deenergized by a battery contained within the lens body.

It is still a further feature of the present invention to provide an indicator lens which indicates the non-operative state of the valve attached thereto, through the use of red LED within the lens body.

DETAILED DESCRIPTION OF THE PREFERRED EMBODIMENT

Figure 3:
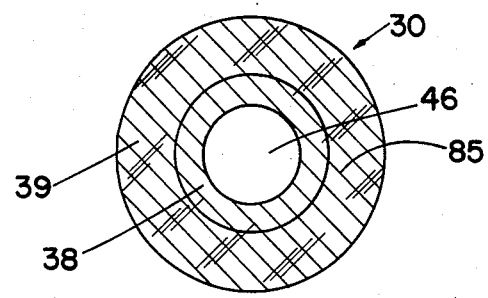
FIGS. 3 and 4 are top views of the lens of the respective operative and non-operative states of the valve.

As was stated earlier, many control systems become operative or inoperative as a function of the presence of fluid under pressure. The indicator of this invention may have utility as an integral part of such safety systems, or as an adjunct thereto such as by being positioned on a control panel with a fluid line connecting the indicator with the monitored system.

Turning now to the FIGS. 1 through 4, FIGS. 1 through 4 illustrate the preferred embodiment of the apparatus of the present invention generally indicated by the numeral 10. Essentially, apparatus 10 would be a lighted indicator system used in conjunction with a typical indicator valve 12, which would normally be comprised of a valve body 14 having a bore 15 therethrough for housing a stem member 16, the stem member 16 having at its first end portion a piston 18 for responding to pressure on piston 18 through port 21, wherein a pilot fluid or the like exerting pressure on piston 18 would move stem member 16 from the down positon of FIG. 2 wherein piston 18 is resting on the end portion 20 of the valve body 12 to the up position of FIG. 1 wherein the piston member 18 has shifted due to fluid pressure.

In this particular apparatus, the invention would comprise, as was stated earlier, a generally transparent lens body 30 having a continuous side wall portion 34 vertically disposed and threadedly attached to neck portion 17 having annular shoulder 20 of valve body 12. Integrally attached at the uppermost portion of vertical wall 34 would be a prismatic portion which for the most part would be a double truncated portion providing an internally truncated angulated refracting surface 37 and external truncated, angulated viewing surface 39, a top viewing surface 38, with a solid body portion 41 therebetween. In this particular embodiment of the lens, interior surface 37 would extend from the uppermost portion of internal vertical wall 34A downward at an angle between 40 to 50 degrees, but, preferably at a 45° angle to the horizontal or vertical to its terminus near shoulder 20.

Similarly, exterior viewing surface 39 would extend from its lowermost point 35 where surface 39 meets exterior wall 34, upwardly at an angle between 53.5° and 54.5°, but preferably 54° from the vertical, to an uppermost point 40, where surface 39 meets viewing surface 38.

Forming the primary inventive aspects of the lighted indicator 10, there is provided within the top portion of indicator lens 30, an annular bore 42 extending downwardly into the main lens body 41 to point 41-A. Housed within bore 42 is continuous metal walled sleeve 44 which would define a stationary cylindrical housing within the body 41 of lens 30.

Figure 2:
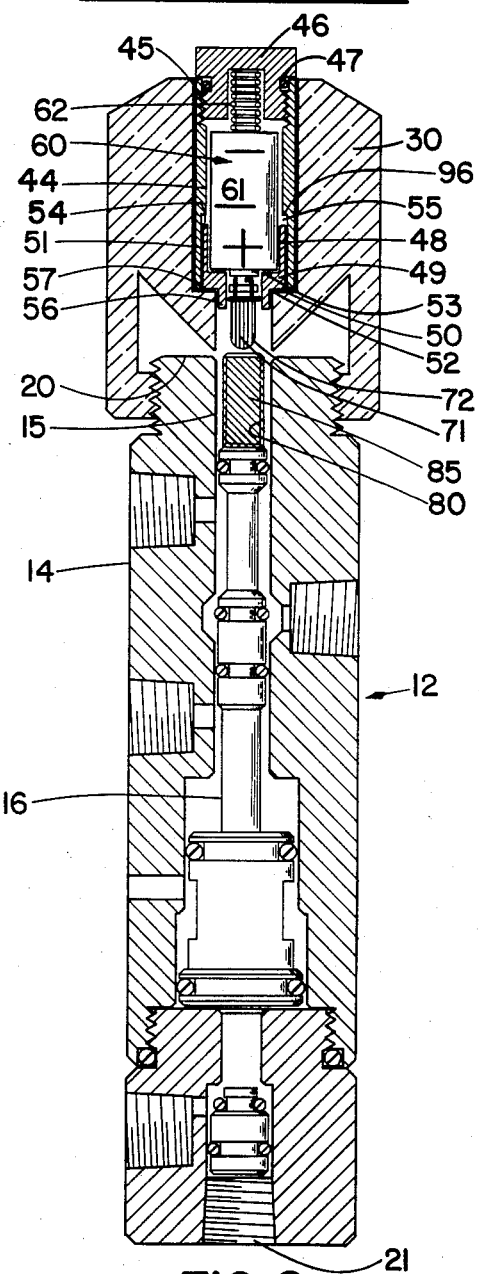
FIG. 2 illustrates a side cross-sectional view of the preferred embodiment of the apparatus of the present invention in the non-operative state of the valve.

As seen in FIG. 3, cylindrical hollow housing or sleeve 44 would be threaded at its upper end 45 for housing a metal dust cover 46 which would be threadably engaged to portion 45 with O-ring seal 47 providing fluid-tight sealing between the exterior and the confines of bore 42 within housing 44. At its lowermost portion housing 44 would provide an internal counterbore 48 with annular shoulder portion 96 formed intermediate bore 48 and bore 42. Provided within lower counter bore 48 would be lower annular sleeve 49 which comprises a continuous side wall portion 51, a floor portion 57 with annular bore 53 therethrough, annular bore 53 leading into a lower neck portion 56, with shoulder portion 50 therebetween. Shoulder portion 50 would rest on the floor portion 52 of lens 30, with, as seen in FIG. 2, there being provided an annular space 55 between the uppermost point 54 of wall portion 51 and shoulder 96, thus allowing upward and downward movement of lower sleeve 49 during operation of apparatus 10.

There is further provided battery 60, which would be a typical 6-volt battery having positive and negative poles on the end portions, preferably of the type manufactured by "Duracell PX 28L". As seen in the FIGS. 1 and 2, battery 60 would be insertable with the positive lead portion within bore 53 of lower neck portion 56, of secondary collar or sleeve 49, and the body portion 61 of battery 60 insertable in bores 42 of collar or sleeve 44 and bore 48 of secondary collar 49. There is further mounted above, in contact with the negative lead of battery 60, spring 62, which would be placed intermediate battery 60, and cap portion 46, housed within bore 63 of cap portion 46 so that upon threadble engagement of cap portion 46 into sleeve 44 battery 60 is pushed downward by the biasing of spring 62 mounted in annular depression 63 of cap portion 46 with the shoulder portion 64 of battery 60 in contact with the lowermost floor portion 57 of secondary collar 49. Further contained within the neck portion 56 of secondary collar 49 is light emitting means (LED) 70, which contains negative and positive leads for contact with battery 60 while battery 60 is in the down position and light emitting filament 71 housed within diode cover 72 and capacitor 73. LED 70 would be stationarily mounted, so that movement of battery 60 would break the contact between battery 60 and LED 70, thus deenergizing LED 70. In the preferred embodiment, cover 72 of diode 70 would be red in color, thus the light emitted would be red. Due to the presence of a capacitor 73 within the LED 70, light emitting diode 70 would blink at the rate of 45 blinks per minute, thus emitting a red blinking light therefrom.

As seen in the drawings, light emitting diode 70 is positioned downwardly within bore 15 which would normally house stem 16. In order to accommodate LED 70 therewithin, the upper portion of stem 16 as seen in the drawings, would contain a bore 80, for accommodating diode cover 72 therewithin when stem 16 moves upwardly. Also, as seen in the drawings, wall portion 19 of stem 16, when in the up position of FIG. 1 would make contact with the lowermost end 81 of neck portion 56 of secondary collar 49. Upon further upward movement of stem 16, stem 16 would impart upward movement of secondary collar 49, against the bias of spring 62, as collar 49 is allowed to move within annular space 55. This slight upward movement of collar 49, would be sufficient to break the contact between LED 70 and battery 60, thus deenergizing the LED 70.

Figure 1:
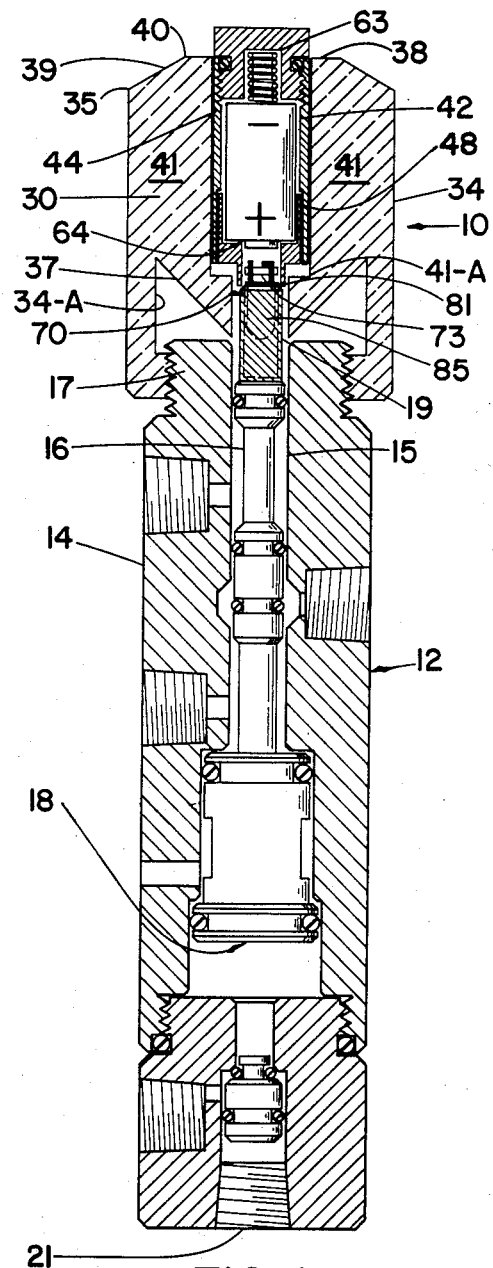
FIG. 1 illustrates a side cross-sectional view of the preferred embodiment if the apparatus of the present invention in the operative state of the valve.
Figure 4:
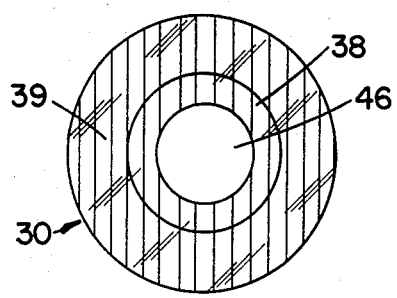

As is further illustrated in the drawings, in that section of stem 16 that accommodates LED 70 within bore 80, on the exterior of stem 16 there is provided green band 85, which would be viewable through lens 30, when stem 16 is in the up position of FIG. 1 as the color would be refracted off of lower refracting surface 37 and viewable through upper viewing surfaces 38 and 39. (FIG. 3) However, when valve 12 is in the non-operative state of FIG. 2, and stem member 16 has been forced in the down position, green band 85 would be contained within the confines of upper body or neck portion 17, and therefore would not be viewable through lens 30. However, due to the presence of the light-emitting diode 70, and the fact that the circuit has now been completed, light-emitting diode 70 would be blinking, due to capacitor 73, and the red lighted color would be viewable exteriorly via lens viewing surfaces 38 and 39.

Therefore, in operation, following the placement of battery 60 within counterbore 48 within lens body 30, cap 46 is threadably engaged thereupon, for sealing the top portion. Upon the presence of pilot fluid under pressure through port 21 on piston 18, stem member 16 would be forced into the up position as seen in FIG. 1, with green band 85 viewable through lens 30 showing valve 12 in the operative state (See FIG. 3). Also, in view of the position of stem member 16, wherein its upper portion has forced moveable collar 49 and thus housing battery 60 upward and out of contact with the leads of LED 70, LED 70 would be deenergized. However upon the loss of pilot fluid under pressure, against piston 18 of stem portion 16, stem portion 16 would shift downwardly in response to the pressure from spring 62, as seen in FIG. 2, thus shifting the color band 85 into the confines of the upper neck portion 17 of valve body 14, and more importantly, allowing battery 60 to be moved downward by spring 62, to reestablish contact with the leads of LED 70, thus allowing LED 70 to emit a red blinking light at 45 intervals per minute, which is highly viewable through indicator lens 30 (See FIG. 4). This novel combination of a lighted indicator, would readily allow viewing of the status of the valve when it is in the non-operative state, by any reader of the panel from a distance, despite the time of day.

Of course, although this particular lighted indicator 10 was described in the preferred embodiment with the use of this particular type of double truncated lens 30, it should be made clear that any suitable viewing lens could be used in combination with this particular light emitting diode 70 and battery pack 60.

Also, although in this particular embodiment the light-emitting diode would be red for signifying a shut-down of the system, the diode could be any color the operator might wish to use for a particular valve, wherein the operative state or other state might be more important to be indicated thereby.

Because many varying and different embodiments may be made within the scope of the inventive concept herein taught, and because many modifications may be made in the embodiment herein detailed in accordance with the descriptive requirement of the law, it is to be understood that the details herein are to be interpreted as illustrative and not in a limiting sense.

What is claimed as invention is:

1. A light-emitting indicator, used in combination with an indicator valve having a housing, a stem member moveable within said housing between up and down positions as a function of the presence of or loss of pressure within the bore of the housing, said light emitting indicator comprising;
    a. a light-emitting means;
    b. a battery in moveable contact with said light-emitting means for energizing said means when in contact with said light-emitting means;
    c. spring means maintaining said battery in contact with said light-emitting means;
    d. means for moving said battery against the bias of said spring out of contact with said light emitting means, in response to pressure on said stem member; and
    e. a viewing lens for transmitting light emitted from said light-emitting means onto the viewing surface of said lens when said battery is in contact with said light-emitting means.

2. The apparatus of claim 1, further comprising an indicia bearing portion of said movable stem member viewable through said viewing lens when said movbale member is in said up position.

3. The apparatus of claim 1, further comprising means for containing said light-emitting means within said movable stem member when a predetermined fluid pressure is present in said bore.

4. The apparatus of claim 3, wherein said means for containing said light-emitting means within said movable stem member prevents said light displaying means from displaying light emitted from said light-emitting means when said movable stem member is in said up position.

5. The apparatus of claim 1, wherein said light-emitting means further comprises a capacitor for effecting blinking of said light-emitting means when energized.

* * * * *